(12) United States Patent
Shomler et al.

(10) Patent No.: US 7,658,310 B1
(45) Date of Patent: Feb. 9, 2010

(54) METHOD AND APPARATUS FOR ATTACHING RIBS ON CARGO TRAILERS

(75) Inventors: Duane Charles Shomler, Cincinnati, OH (US); Gary Michael Bohart, Cincinnati, OH (US); Michael P. Harvey, Cincinnati, OH (US)

(73) Assignee: Senco Brands, Inc., Cincinnati, OH (US)

( * ) Notice: Subject to any disclaimer, the term of this patent is extended or adjusted under 35 U.S.C. 154(b) by 746 days.

(21) Appl. No.: 11/303,339

(22) Filed: Dec. 16, 2005

(51) Int. Cl.
*B23B 49/02* (2006.01)
*B25C 5/00* (2006.01)
*B23P 11/00* (2006.01)

(52) U.S. Cl. .......... 227/139; 227/107; 227/15; 408/115 B; 408/115 R

(58) Field of Classification Search .......... 29/464, 29/466, 468, 469, 432; 227/15, 107, 119, 227/139, 140, 154; 408/3, 115 R, 115 B
See application file for complete search history.

(56) References Cited

U.S. PATENT DOCUMENTS

| | | | |
|---|---|---|---|
| 2,560,382 A * | 7/1951 | Barr | 408/97 |
| 3,046,558 A * | 7/1962 | Hadnagy | 227/69 |
| 3,670,941 A * | 6/1972 | Grinnell et al. | 227/8 |
| 4,376,338 A * | 3/1983 | Wickham | 29/741 |
| 5,056,966 A * | 10/1991 | Lee | 408/115 R |
| 5,064,319 A * | 11/1991 | Ericksen | 408/115 R |
| 5,642,641 A * | 7/1997 | Maxfield et al. | 72/358 |
| 5,743,455 A * | 4/1998 | Holliday | 227/142 |
| 5,988,026 A | 11/1999 | Reckelhoff et al. | |
| D462,001 S | 8/2002 | Bohart et al. | |
| 6,824,036 B2 * | 11/2004 | Walter | 227/120 |
| 6,941,627 B2 * | 9/2005 | Fritsche et al. | 29/243.53 |
| 7,017,790 B1 * | 3/2006 | Peng | 227/119 |
| 7,055,728 B2 * | 6/2006 | Lin | 227/110 |
| 7,384,081 B2 * | 6/2008 | Shishikura | 293/1 |
| 2007/0215668 A1 * | 9/2007 | Tabacco et al. | 227/107 |

* cited by examiner

*Primary Examiner*—Essama Omgba
(74) *Attorney, Agent, or Firm*—Frederick H. Gribbell

(57) ABSTRACT

An improved fabrication apparatus is provided for the placing screws accurately and reliably into body panels of cargo trailers. The apparatus uses a template that is positioned over the aluminum body panels of a cargo trailer to guide the placement of automatic screwdriver tools, so that the body panels are quickly and accurately mounted to vertical ribs that are part of the framework of the trailer. The invention includes a fabrication fixture that holds the template at predetermined positions to align the template with the ribs of the trailer's framework.

32 Claims, 9 Drawing Sheets

METHOD AND APPARATUS FOR ATTACHING RIBS ON CARGO TRAILERS

TECHNICAL FIELD

The present invention relates generally to fabrication equipment and is particularly directed to an apparatus and method which places screws accurately and reliably into body panels of cargo trailers. The invention is specifically disclosed as a template that is positioned over the body panels of a cargo trailer to guide the placement of automatic screwdriver tools, so that the body panels are quickly and accurately mounted to vertical ribs that are part of the framework of the trailer. The invention also includes a fabrication fixture that holds the template at predetermined positions to align the template with the ribs of the trailer's framework. The invention further includes a method for fabricating body panels to a framework of a cargo trailer.

BACKGROUND OF THE INVENTION

Cargo trailers are vehicles that typically are towed behind pick-up trucks and large automobiles, for the most part. Cargo trailers can also be towed behind larger vehicles, including large recreational vehicles, and the like. A cargo trailer itself could be considered a recreational vehicle in many cases, although by definition a cargo "trailer" would not be self-propelled, but would be towed.

Vehicles such as cargo trailers, and perhaps other types of recreational vehicles such as campers, are typically constructed using a set of bottom frame rails, and four corner vertical supports or "posts." The vertical supports can then hold a top horizontal edge or corner rail along each side of the cargo trailer and, if desired, also horizontal rails along the rear-top corner and the front-top corner of the trailer. The elongated longitudinal sides are typically made of aluminum sheet material, although other types of materials could be used if desired. Such sheets of material are typically screwed into position by being mounted on multiple, parallel vertical supports that run between the top elongated edge rail and the bottom elongated edge rail of one side of the trailer. These parallel vertical supports are often referred to as "rails" or "ribs." In the case of many cargo trailers built in the United States, these vertical ribs are spaced-apart by a constant distance, such as sixteen inches or twenty-four inches, between centerlines of the vertical ribs. In many cases, the ribs are in the form of a type of U-channel, which also is referred to as a "hat" channel by many manufacturers of cargo trailers. When viewed in cross-section, such hat channels have the appearance of a top hat with a rim on both sides. (See FIGS. 3 and 4 for an example of such a cross-section of a hat channel.)

Many manufacturers of cargo trailers use aluminum sheets that are approximately 4-8 feet wide, and 6-10 feet tall, depending on the height of the trailer. The sheets are typically screwed into the hat channels at a constant spacing in the vertical direction, and the spacing between the screws is typically five inches between the centerlines of the screws. This of course can be adjusted to a different distance, if desired. The conventional method for determining the positions of the screws is for the trailer manufacturer to mark a grid across the exterior surface of the aluminum sheet material using blue lines or some type of chalk lines to mark vertical positions and horizontal positions, thereby creating an X-Y grid of the screw locations. The vertical lines indicate the position of one of the hat channels that will be behind the aluminum sheet as the aluminum sheet is screwed to the hat channel. The horizontal lines indicate the (vertical) spacing between the screws going down the hat channel location.

Some cargo trailers use ribs that go around both walls and also across the top of the body of the trailer, and in that situation the top of the trailer will also have aluminum sheet material screwed into similar hat channels that are run horizontally across the roof of the trailer, between the two elongated top horizontal rails that form the left and right longitudinal edges of the trailer framework. The ribs themselves could even be bent into a U-shape to form the walls and top of a body, or they can be made of separate linear pieces of hat channel material, if desired.

Referring now to FIG. 1, a side view of a conventional cargo trailer is depicted, showing its right side before an outer skin made of aluminum body panels is applied to the framework. The overall structure is generally referred to by the reference numeral 10, while a rear vertical corner post is at 20, and a front corner post is at 22. These posts essentially are vertical members, although trailers can be constructed with non-vertical front and rear surfaces, if desired. In FIG. 1, there are multiple parallel hat channel ribs generally designated by the reference numerals 30, and these are typically spaced-apart from one another by a predetermined distance "S1". While it is not always necessary to use the same spacing between each of these vertical ribs, it is typically done for ease of construction. In FIG. 1, the trailer 10 also has other vertical support members designated at the reference numerals 32, which may or may not be constructed of the same type of hat channel material. These other vertical supports could be any appropriate type of material desired by the manufacturer, such as angle or Z-ribs, if desired. In fact, all of the side supports throughout the trailer (vertical supports, or otherwise) can be Z-ribs, if desired.

In the trailer 10, there is an elongated top frame member 24 that is visible extending between the rear corner post 20 and the front corner post 22. This top frame member 24 is generally horizontal, until nearing the front corner post 22, at which time the top frame member angles down, as can be seen in FIG. 1. It should be noted that the top frame members along the top left and right corner edges of the trailer can be entirely horizontal, if desired by the designer, or can be segmented at various angles, if desired. For example, the slope in the front-most frame member portion near the front corner post 22 only runs a small distance in FIG. 1, however, on some cargo trailers the roof portion of the cargo trailer begins to slope downward at a position much closer to the mid-point between the front- and rear-most portions of the trailer. Again, this is a matter of design choice.

In FIG. 1, there are also bottom frame members generally designated by the reference numeral 26, which extend along the bottom right edge of the framework. These frame members 26 are generally horizontal in FIG. 1, although it can be seen that the rear-most bottom frame member 26 extends downward toward the rear corner post 20. Again, the exact angles are a matter of design choice.

In the trailer 10, there are a few openings 40 for windows, as well as a cargo opening 42, a furnace opening 54, and also openings for vents at 50 and for a vent door at 52. The "straight" longitudinal run of the bottom frame members 26 is interrupted at a wheel well 44. Again, this is a matter of design choice, although wheel wells are fairly standard in conventional cargo trailers. It should be noted that the windows and cargo openings are optional in the side walls of a cargo trailer; this is a matter of design choice.

Referring now to FIG. 2, a hat channel rib 30 is depicted in a side view, and also shows the conventional construction of the outer skin which is typically made of aluminum sheet at 60, and the inner lining at 64 is typically made of a relatively thin laminate material, such as plywood (also known as "luan"). A pair of screws 62 are depicted in FIG. 2, and are shown in their inserted position through the aluminum sheet material 60 and through one of the members 34 of the hat channel 30. This portion 34 of the hat channel can be referred to as a "base leg portion," which is better viewed in FIG. 3, which illustrates the hat channel 30 in cross-section. In FIG. 3, it can be seen that the hat channel 30 has a U-portion 36, and two base leg portions 34. Referring back to FIG. 2, the spacing between the centerlines of the screw 62 is referred to as a distance "S2". This distance S2 typically would be a vertical distance along one of the ribs 30, when viewed from the perspective of FIG. 1.

In FIG. 3, the aluminum sheet material is at the top-most portion of the view, and the thin plywood 64 is at the bottom-most portion of the view. Numeral 66 on FIG. 3 designates a location where a screw could be placed to hold the thin plywood 64 to the hat channel rib 30.

Referring now to FIG. 4, the rib 30 could still be made of the same hat channel material, but used in its opposite direction. In FIG. 4, the U-portion 36 is directed toward the aluminum sheet material 60, while the two base leg portions 34 are directed toward the thin plywood material 64. In this construction of FIG. 4, there are two locations 66 where a screw could be placed through the thin plywood 64 and into the hat channel rib 30, if desired.

Referring now to FIG. 5, a different form of rib material is illustrated by the reference numeral 70. In this view, a Z-angle material is used, and the screw 62 is placed in one of the two horizontal (in this view) portions of the Z-angle rib. The opposite horizontal portion (in this view) will give rise to having a screw placed at the location 66, to hold the thin plywood 64 in place against the Z-angle 70. Naturally, other shapes of ribs could be used than the hat channels 30 and Z-angles 70 depicted so far in the drawings.

When using conventional construction techniques, the trailer fabricator must place the aluminum sheet in a position between the top and bottom side (edge) frame rails (or supports), and then screw the individual screws into the aluminum sheet and into the hat channel, at the appropriate locations. Since the locations are marked on a grid, the worker knows exactly where he or she is supposed to place the screws that are to penetrate the aluminum sheet and the hat channel. However, most conventional trailer manufacturers use hand-held screws along with automatic screwdriver tools, and there is no "good" way to ensure that the screw will actually penetrate the aluminum sheet accurately at the appropriate location, and worse, there is no assurance that the screw will not slip as it attempts to enter the aluminum sheet, and then possibly scratch the surface of the aluminum sheet. Since many of the cargo trailers are painted various colors (such as a dark red color) on the outer surface of the aluminum sheet, a slipped screw will likely scratch the sheet and essentially ruin its appearance. When that occurs, the worker will typically be required to unscrew all of the previously placed screws for that particular aluminum sheet material, and remove that particular body panel (aluminum sheet) from the side of the trailer, and start over with a new aluminum sheet. This can greatly increase the manufacturing time, particularly if the worker had already installed most of the screws required for that particular sheet of aluminum material. It would be an improvement to use an automatic screwdriver tool that can accurately place the screws at the appropriate locations in the aluminum sheet, and which will ensure that the screw will be properly driven through the aluminum sheet and into the hat channel, without a significant chance of slipping and scratching the outer surface of the aluminum sheet.

SUMMARY OF THE INVENTION

Accordingly, it is an advantage of the present invention to provide a methodology in which side body panels can be permanently attached to support ribs of a vehicle such as a cargo trailer, by use of automatic or manual screwdriver tools that will accurately place screws in the proper position in the aluminum side panels, and without accidentally scratching the aluminum side panels during the fabrication operations.

It is another advantage of the present invention to provide a fabrication fixture that allows the fabricator to initially align a horizontal member of the fabrication fixture to the physical location of multiple parallel support ribs along the side structures of a vehicle such as a cargo trailer, and then to provide a template that will receive the nosepiece of a screwdriver tool at the proper locations to fasten side body panels to vertical support ribs of the cargo trailer.

It is a further advantage of the present invention to provide a vertical template fabrication fixture with multiple target template positions that each will receive a nosepiece of a screwdriver tool, thereby allowing the fabricator to accurately place a tool and drive a screw through the body panels and into a support rib, with confidence at having an accurate location for the screw, while also substantially preventing a screw from slipping and scratching the outer surface of the body panel.

It is yet another advantage of the present invention to provide a fabrication station for attaching side body panels to vertical support ribs of a vehicle such as a cargo trailer, using a horizontal beam that can be laterally indexed to an appropriate location with respect to the cargo trailer, in which this beam has multiple rib locators that act as guides for hanging or mounting a rib template subassembly, in which the rib template subassembly exhibits multiple targets for receiving the frontmost portion of a nosepiece of a screwdriver tool that allows the fabricator to quickly place the screwdriver tool into each of the template positions, thereby driving a screw through the side body panels and into the vertical support ribs of the cargo trailer at correct locations.

It is yet a further advantage of the present invention to provide a method of fabrication, in which a framework with unattached side body panels is brought to an assembly station, a fixture is provided that aligns in the horizontal direction a series of locator structures, and a rib template subassembly is positioned in sequence on each of the locator structures, in which the rib template subassembly itself has multiple targets that guide a fabricator into placing the frontmost portion of an automatic screwdriver tool, and thereby allowing the fabricator to accurately place screws through the body panels and into the vertical ribs, and doing so with confidence that the screws will not substantially slip and score the outer surface of the body panels during the fabrication steps.

It is still another advantage of the present invention to provide a rib template subassembly that can be placed along side body panels of a framework for a vehicle such as a cargo trailer, in which the rib template subassembly has multiple target templates that act as receptacles to receive the frontmost portion of an automatic screwdriver tool, and thereby allows a fabricator to accurately place screws through the body panels and into vertical ribs, and moreover in which the rib template subassembly can be accurately positioned and held in place by various mechanical or magnetic means, including suction cups, permanent magnets, wheels or skids on a factory floor or on rails to support the weight of the rib template subassembly, or hung from a horizontal beam that has locator structures at various predetermined spacings.

It is yet another advantage of the present invention to provide a horizontal template fabrication fixture that can be placed over (e.g., above) a set of panels that are to be fabricated into a sub-floor of a vehicle such as a cargo trailer, in which the horizontal template fabrication fixture has multiple target template positions that each will receive a nosepiece of a screwdriver tool (or of a drill), thereby allowing the fabricator to accurately place a tool and drive a screw (or drill a hole) through the sub-floor panels and into a chassis frame members or other types of frame supports, with confidence at having an accurate location for the screw (or hole), while also substantially preventing a screw (or drill bit) from slipping and scratching the inner surface of the sub-floor panels. The template positions can be predetermined so as to avoid having screws (or holes) being driven at incorrect locations, such as where water tanks, fuel tanks, electrical wiring, gas piping, water piping, etc. would be positioned beneath the sub-floor.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an apparatus used for placing screws into a sheet of material is provided, which comprises: at least one elongated support member that extends between a first end and a second end; a locating structure proximal to the first end used for positioning the at least one elongated support member at a desired predetermined location, such that the extension between the first end and the second end encompasses at least a linear distance between a first desired target location and a second desired target location; and a plurality of target template subassemblies that are attached to the at least one elongated support member, the target template subassemblies being positioned at predetermined distances along the at least one elongated support member; wherein, (a) the target template subassemblies exhibit: (i) a depression that has a predetermined shape for receiving a separate screwdriver tool, and (ii) an opening that allows a separate screw to be driven therethrough; (b) when a separate screwdriver tool is placed into the depression of one of the target template subassemblies, the size and shape of the depression substantially prevents the screwdriver tool from slipping from a proper orientation; and (c) the positions of the target template subassemblies substantially ensure that a plurality of screws will be driven at a plurality of predetermined target locations between the first end and the second end.

In accordance with another aspect of the present invention, a fabrication fixture is provided, which comprises: (a) an elongated beam member that extends at least between a first vertical corner member of a framework and a second vertical corner member of the framework, the elongated beam member being movable in a substantially horizontal direction with respect to the framework, the beam member having a plurality of spaced-apart rib location indicators thereon between the first and second vertical corner members of the framework; and (b) a rib template subassembly that is temporarily positioned proximal to one of the plurality of rib location indicators, the rib template subassembly comprising: (i) at least one elongated support member that extends in a substantially perpendicular direction with respect to the beam member, between a first end and a second end of the at least one elongated support member; (ii) a locating structure located near the first end, the locating structure having a size and shape to abut one of the plurality of rib location indicators, and thus to correctly position the rib template subassembly with respect to the beam member; (iii) a plurality of spaced-apart target template receptacles mounted along the at least one elongated support member, the target template receptacles having a keyed depression and a through-hole; and (iv) a holding apparatus located between the first end and the second end.

In accordance with yet another aspect of the present invention, a method for fabricating body panels on a cargo trailer is provided, in which the method comprises the following steps: (a) providing an elongated beam member having a first end and a second end, the beam member having a plurality of spaced-apart rib location indicators between the first and second ends, the beam member being slidably coupled to at least one linear bearing; (b) positioning the beam member along the at least one linear bearing such that at least one of the rib location indicators is aligned with a first one of a plurality of vertical support ribs of a framework of a cargo trailer; (c) positioning a rib template subassembly proximal to one of the plurality of rib location indicators, the rib template subassembly having a plurality of spaced-apart target template receptacles, each of the target template receptacles having a keyed depression and a through-hole; and (d) positioning a screwdriver tool against the keyed depression in one of the target template receptacles, and driving a screw through the through-hole in the target template receptacle, and into a first one of at least one body panel and the first one of the plurality of vertical support ribs, thereby fastening the first body panel to the first vertical support rib.

In accordance with a further aspect of the present invention, an apparatus used to assist in fabricating a sheet of material to a hidden body is provided, which comprises: at least one support member that extends substantially in a plane; a plurality of target template subassemblies that are attached to the at least one support member, the target template subassemblies being positioned at predetermined locations along the at least one support member; wherein, (a) the target template subassemblies exhibit: (i) a substantially planar area of material having a predetermined thickness; (ii) a depression in the substantially planar area of material, the depression having a predetermined shape for receiving a separate tool, (iii) the depression not extending completely through the substantially planar area of material, and thereby forming a wall having a shape that is substantially the same as the predetermined shape, and (iv) an opening in the wall that extends therethrough; (b) when a separate tool is placed into the depression of one of the target template subassemblies, the size and shape of the depression substantially prevents the tool from slipping from a proper orientation; and (c) the positions of the target template subassemblies substantially ensure that the separate tool will be used only at a plurality of predetermined target locations along the at least one support member.

In accordance with yet a further aspect of the present invention, an apparatus used to assist in fabricating a sheet of material to a hidden body is provided, which comprises: a support member that extends substantially in a plane; a plurality of target templates that are positioned at predetermined locations along the at least one support member; wherein, (a) the target templates exhibit: (i) an opening in the substantially planar support member, the opening having a predetermined shape for receiving a separate tool, and (ii) the opening extending completely through the substantially planar support member; (b) when a separate tool is placed into the opening of one of the target templates, the size and shape of the opening substantially prevents the tool from slipping from a proper orientation; and (c) the positions of the target templates substantially ensure that the separate tool will be used only at a plurality of predetermined target locations along the at least one support member.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 6:
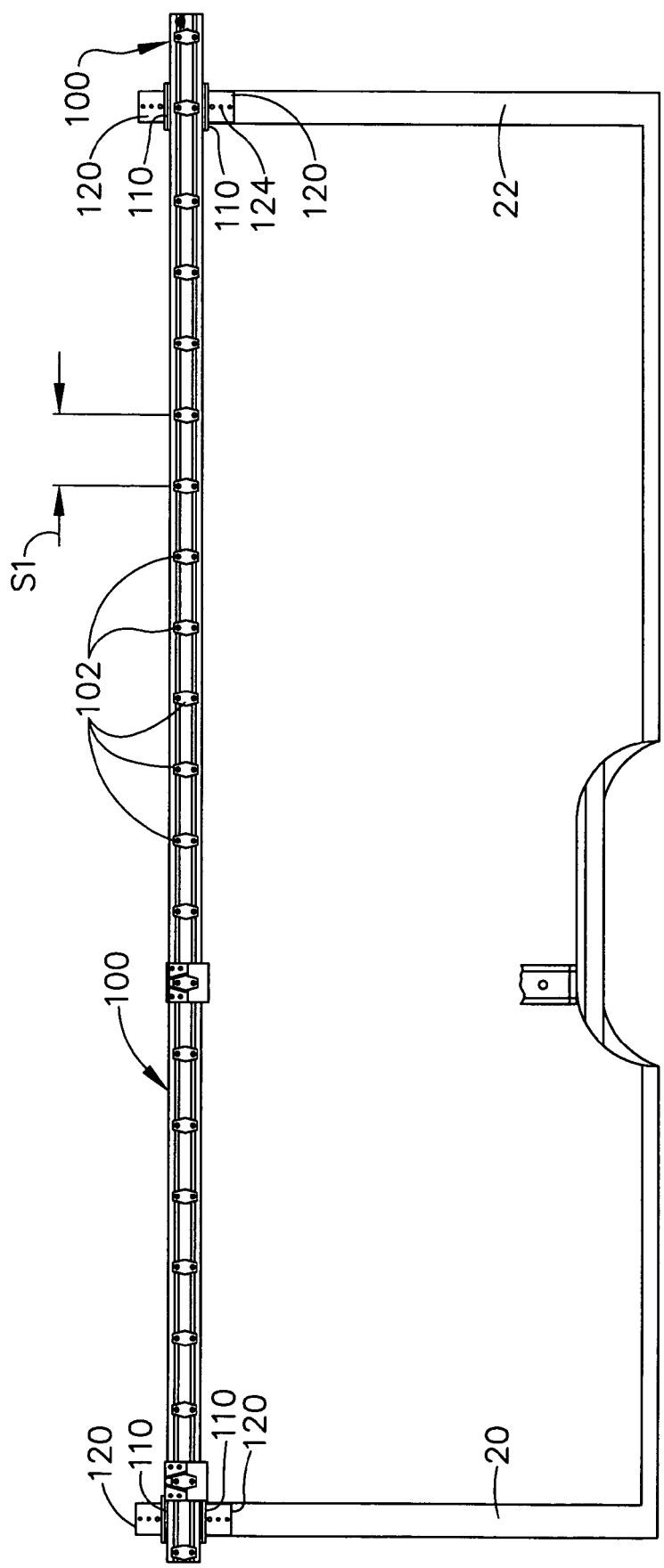
FIG. 6 is a side elevational view of a cargo trailer under construction, using a movable beam member with multiple rib locators, as constructed according to the principles of the present invention.

The present invention encompasses both a method and a fabrication fixture apparatus for constructing aluminum sheet (or other types of sheet material) to the vertical ribs of a cargo trailer, mainly by providing a template that gives an accurate placement for the screws to be placed through the aluminum skin and into the vertical ribs, while at the same time making it fairly easy for the fabricator to accurately place the nose of an automatic screwdriver tool into the template and also to be assured of a properly driven screw that, during insertion, will not substantially slip and score the outer surface of the aluminum sheet material. Referring now to FIG. 6, the right side of a cargo trailer is depicted, essentially from the same angle as the view depicted in FIG. 1 of the framework of a trailer. In FIG. 6, the rear corner post 20 and the front corner post 22 are depicted by their respective reference numerals, while the remainder of the trailer is illustrated in less detail; the outer skin portion typically would comprise aluminum sheets that are to be screwed on in a side-by-side relationship. The details of the aluminum sheets are not shown in FIG. 6, but they would typically be sheets having vertical edges that are abutted against one another so as to provide a smooth and substantially complete vertical side surface for the cargo trailer.

Figure 1:
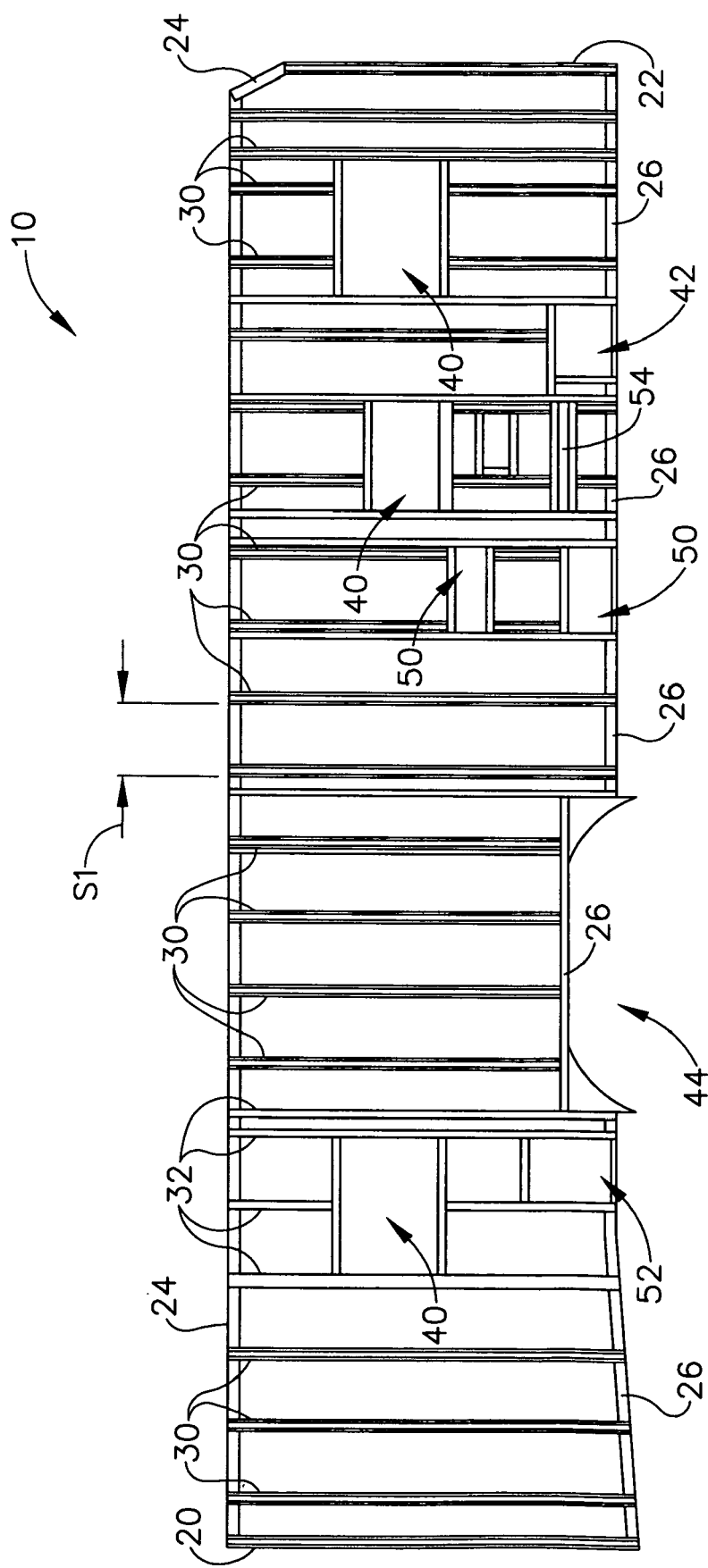
FIG. 1 is a side elevational view of a framework for a conventional cargo trailer.

In FIG. 6, an elongated beam member 100 is depicted in a position that extends from left-to-right (in this view), in which the left-most portion extends past the rear corner post 20, and the right portion of the beam member 100 extends past the front corner post 22. Beam member 100 is constructed of a frame-type material that can be moved laterally (i.e., from left-to-right in the view of FIG. 6) to properly position a set of multiple "rail locators" or "rib locators" 102. These rib locators 102 act as male locating structures that will essentially line up with one of the vertical ribs that is already in place between the bottom frame member and top frame member along (both the left and right) bottom and top edges of the cargo trailer 10 (see FIG. 1). Rib locators 102 (also referred to herein as "rib location indicators") typically will be accurately placed at the appropriate intervals, and in this situation they would be placed in a spaced-apart relationship at a distance S1 from one another, so as to match up with the centerlines of the ribs 30 that are depicted in FIG. 1.

In most cargo trailer manufacturing facilities, the construction begins at the rear portion of the trailer and extends toward the front portion. One reason for this is that the rear portion of the standard cargo trailer is typically the largest portion along the side walls, since many trailers have a sloped front, and that sloped top roof surface may not be horizontal at the very front post 22. Therefore, it may be easier to start at the back portion, whether the roof portion near the rear corner post 20 is horizontal or not.

The location of the vertical ribs 30 will determine the lateral proper position for the beam member 100, when it is to be positioned so as to properly locate the screw holes that will be placed in the aluminum panels and in the vertical ribs 30. A linear bearing 110 will be temporarily fixedly attached, using an adapter plate 120, to the rear corner post 20 and the front corner post 22. A more-detailed view of the linear bearing 110 and the adapter plate 120 is provided in FIG. 7. In the illustrated embodiment, the adapter plate 120 has a pair of mounting holes 122 that hold the linear bearing 110 to the adapter plate 120. Also, adapter plate 120 has two pairs of mounting holes 124 that are used to bolt the adapter plate 120 to the front and rear corner posts 20 and 22 of the cargo trailer 10. Of course, the mounting of the adapter plate 120 to the front and rear corner posts 20 and 22 usually is only a temporary relationship, which will hold the beam member 100 in its proper location during the construction phase of the aluminum side plates for the cargo trailer 10.

Figure 7:
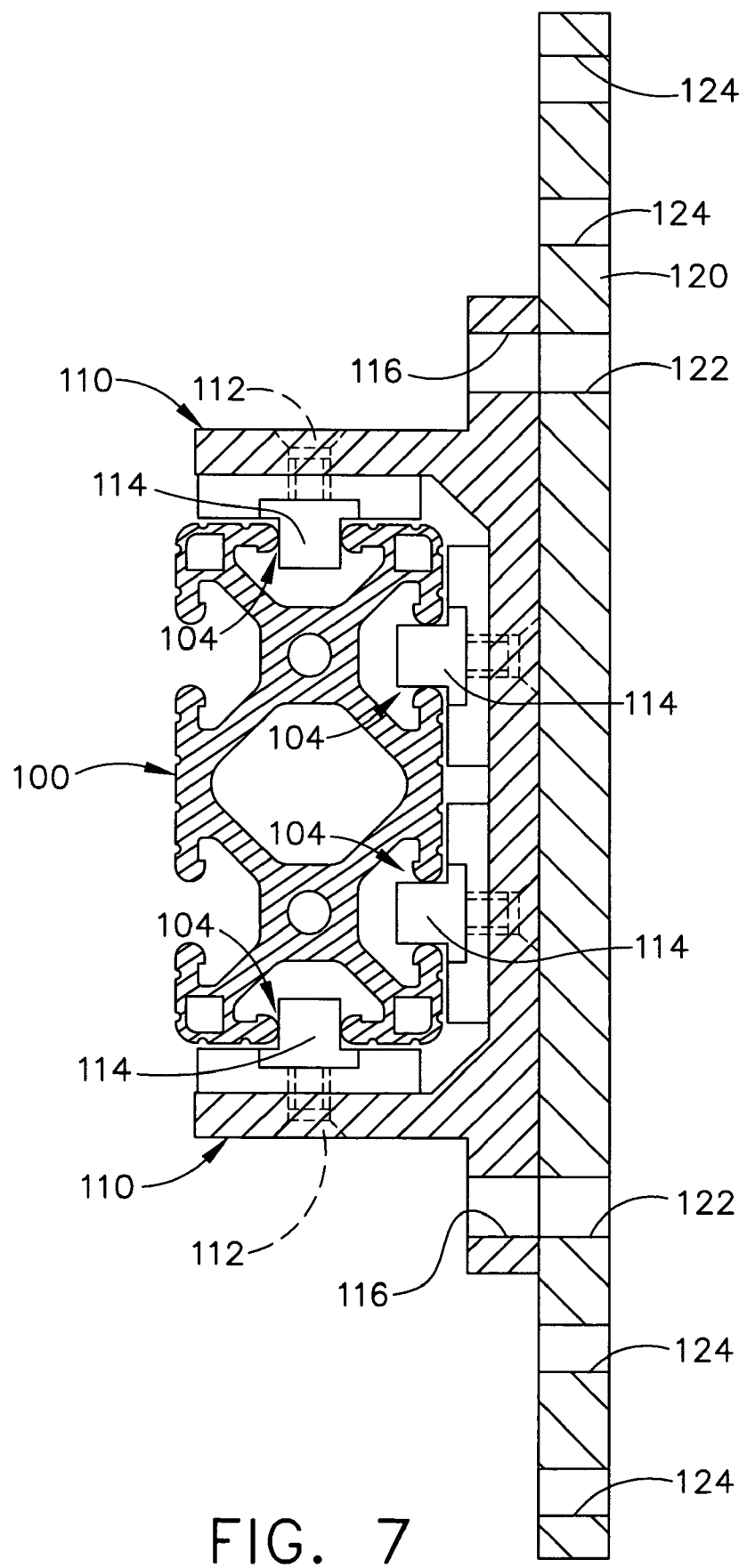
FIG. 7 is a side elevational view of the beam member of FIG. 6, as it is mated to a linear bearing, which is attached to an adapter plate.

Referring now to FIG. 7, it can be seen that the illustrated beam member 100 is not merely a rectangular device, nor even an I-beam. In the illustrated embodiment depicted in FIG. 7, the beam 100 is referred to in the industry as a "T-slotted extrusion and quick frame." Beam 100 has multiple openings at 104 that will act as sliding surfaces. These sliding surfaces will make contact with plastic rotatable bearings 114 that are mounted in the linear bearing 110. The plastic bearings 114 are moved into position by adjusting screws 112. Since the beam member 100 is thus slidably mounted, it allows beam member 100 to readily be moved from one horizontal position to another, and accurately bring the rib locators 102 to their proper positions so as to match up to the horizontal location of the various ribs 30 that have already been fabricated in the cargo trailer framework.

As can be seen in FIG. 7, a pair of mounting holes 116 in the linear bearing 110 match up with the pair of mounting holes 122 in the adapter plate 120. In this manner, the entire structure can be bolted together. Of course, this fixed attachment could be a weld or other form of mechanical attachment, if desired.

It should be noted that the beam 100 and the linear bearing 110 are commercially-available items. The linear bearing 110 is typically referred to as a "double-flange linear bearing," in the industry.

Figure 8:
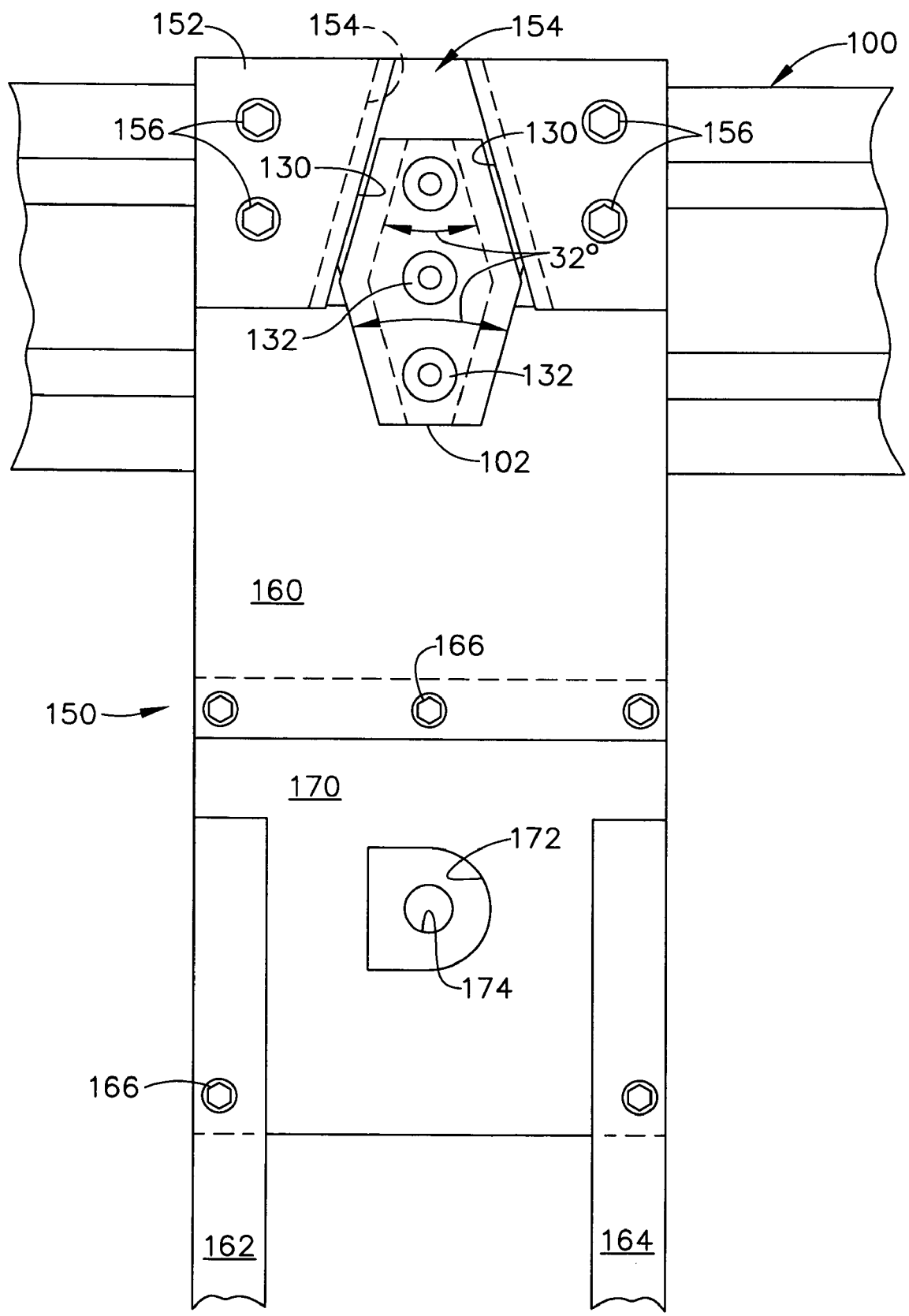
FIG. 8 is a front elevational view of a rib template subassembly as constructed according to the principles of the present invention, as it would be used with a beam member of FIG. 6 along with one of its rib locators.

Referring now to FIG. 8, this is a view from the "front" of a rib template subassembly, generally designated by the reference numeral 150. This rib template subassembly 150 is constructed so as to extend in a longitudinal direction that typically will be placed in a vertical orientation. The uppermost portion is depicted in FIG. 8, showing a rib female locator 152 that has a recess 154. This recess 154 acts as a female locating structure and, in the illustrated embodiment, comprises a slot for being positioned around certain surfaces of one of the rib locators 102 that are mounted on the elongated beam member 100. As can be seen in FIG. 8, the female recess 154 is angled, and this angle is essentially parallel to the outer edges 130 that make up the male locator portion of the rib locator 102.

The rib male locator 102 has a set of mounting holes and screws or bolts at 132 to affix it to the beam 100. The rib female locator 152 has mounting holes with screws or bolts at 156 to hold it in place with a "bridge plate" 160, which extends downward in the view of FIG. 8. Of course, the bridge plate 160 and the rib female locator 152 could be constructed as a unitary device, if desired.

A target template subassembly 170 is attached to the bridge plate 160 using screws or bolts with mounting holes (which may be threaded) at the positions designated by the reference numerals 166. A pair of vertical support rails 162 and 164 extend further downward (in the view of FIG. 8), and are attached to the target template subassembly 170 by use of screws or bolts along with mounting holes (which may be threaded) at 166.

The target template subassembly 170 is thereby positioned so as to have an aperture or opening 174 at a location where a screw should be driven through the aluminum sheet material and into one of the vertical ribs 30 of the cargo trailer 10. In addition, a target for the nose plate of a screwdriver tool is also provided at 172, as a depression in target template subassembly 170. This target 172 preferably has a unique shape (as a "keyed depression"), so that the nosepiece of the screwdriver tool can only fit into the target 172 in a particular manner, and once so positioned, the nosepiece of the screwdriver tool will not easily slip, vertically, horizontally, or rotationally. Thus, the screwdriver tool will be prevented from substantially slipping from a proper orientation in a translational direction in a plane that is perpendicular to a desired orientation of the screw.

Note that, even if a screw does somehow slip and mildly score the sheet material of the cargo trailer, the damaged area can often be "rescued" by driving a second screw into the same location in the sheet material. When properly using an automatic screw driving tool, for example, with the template fixture of the present invention, the second screw can be inserted at the previous (damaged area) location, and the driven screw head (of this second screw) may well cover that very scoring in the side wall, thus solving a potential problem.

Figure 9:
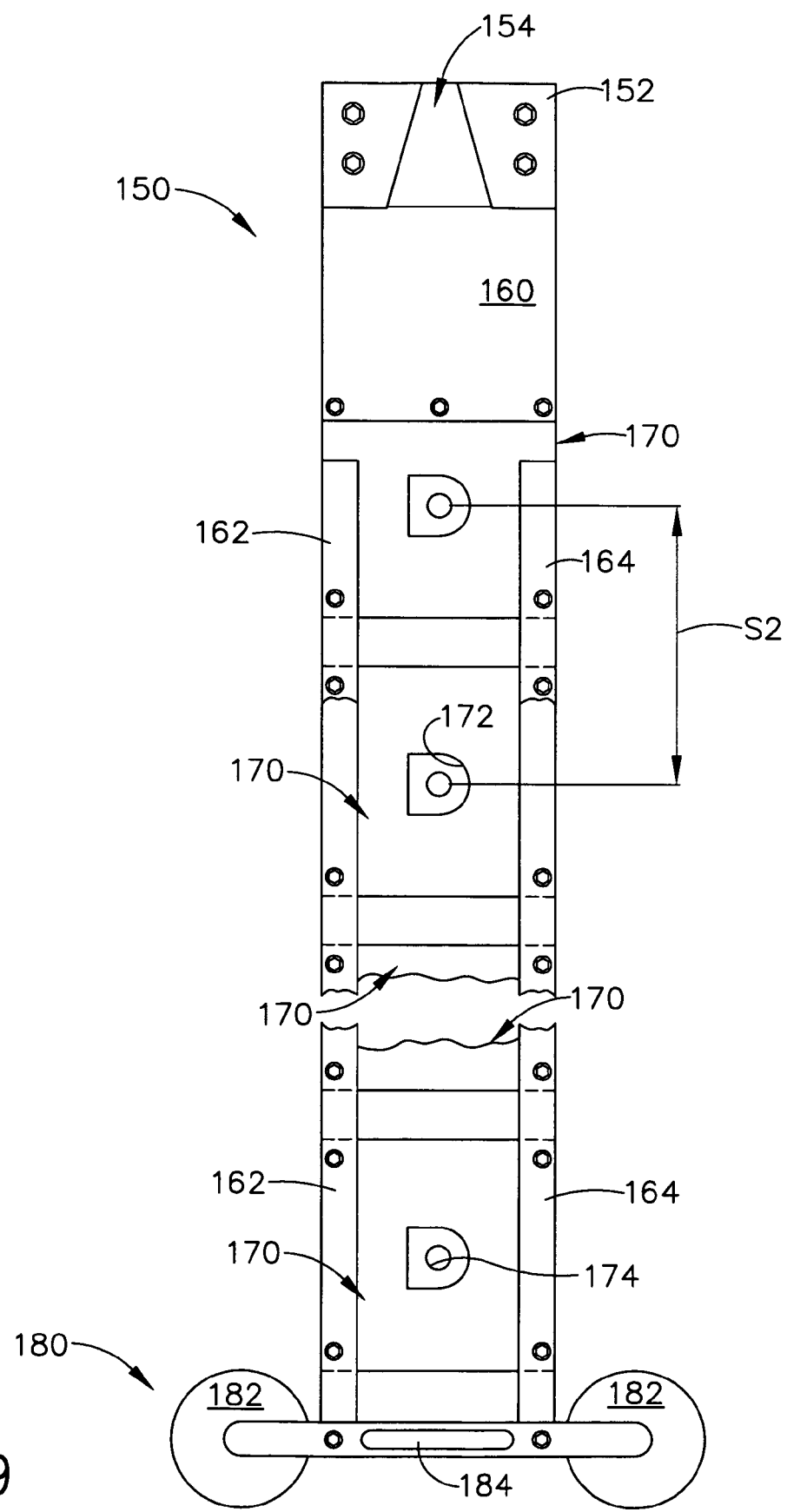
FIG. 9 is a front elevational view of a larger portion of the rib template subassembly of FIG. 8.

In addition, the screw to be driven will nominally be held in a proper orientation, i.e., along a predetermined longitudinal axis of the screw, by the screwdriver tool; this assumes that the worker (fabricator) holds the screwdriver tool firmly against the depression (or target) 172 in the target template subassembly 170. In this manner, the screwdriver tool will be properly positioned so as to drive a screw through the aperture 174, into and through the aluminum sheet, and into (and probably through) one of the vertical ribs 30 of the cargo trailer. The fabricator will thus be able to quickly insert the screwdriver tool at its proper location for lining up to the vertical rib 30, and the screwdriver tool will automatically drive the screw substantially without slipping and scratching the outer surface, thereby ensuring a good screwdriving event, and an accurate placement. As can be seen in FIG. 9, there will be multiple target template subassemblies 170, each having its own screw aperture 174 and nose target 172, and the fabricator can quickly go from one of the target templates 170 to the next, to the next, etc.

As can be seen in FIG. 8, the shape or profile of the target area 172 is half-circle, half-square. More precisely, the right portion of the profile is a semicircle, and the left portion of the profile is rectangular; these two shapes "meet" at a "centerline" (of the profile) that may also run through the center of the opening 174. Joining two geometric shapes at a line which runs through the center of opening 174 is not a requirement, of course, but is substantially close to that depicted in FIG. 8. Other shapes for the nose target profile certainly can be used without departing from the principles of the present invention.

FIG. 9 illustrates a larger portion of the rib template subassembly 150, in that it shows three whole target template subassemblies 170, as well as portions of two others. In addition, it shows the bottom-most portion of the rib template subassembly. In the embodiment illustrated in FIG. 9, a pair of suction cups 182 are arranged on a suction cup subassembly 180. An operating handle 184 can be used by the fabricator to first apply the suction cups 182 to the surface of the aluminum sheet material that is being worked on, and then when all of the screws have been placed using the target template subassemblies 170, the operating handle 184 can be actuated to release the suction cups 182 from the aluminum sheet material.

The suction cups at the bottom-most portion of the rib template subassembly 150 is merely one method of holding the bottom portion of subassembly 150 in place during the screwing process of the screws through the aluminum sheet and ribs 30. As discussed above, the rib female locator 152 has a recess 154 that is used to place the rib template subassembly 150 in a proper location with regard to the top-most portion of the rib template subassembly 150. Other methods than suction cups could be used for holding the bottom portion in place. For example, the lower areas of the rib template subassembly 150 could be mounted to wheels (or skids) such that the entire template subassembly can roll around on (or slide along) the factory floor, if desired. Alternatively, the wheels could have flanges and could roll along a rail, again placed on the factory floor. As a further alternative, portions of the rib template subassembly 150 could be made of magnetic material such that the entire template subassembly 150 could effectively "stick" to the aluminum sheet using magnets that are attracted to a steel rib 30. Of course, the magnets would not be attracted to the aluminum sheet, so either fairly strong permanent magnets could be used, or a fairly large set of permanent sheet magnets could be used as part of the rib template subassembly 150. This magnetic embodiment will be discussed in greater detail, below.

Figure 2:
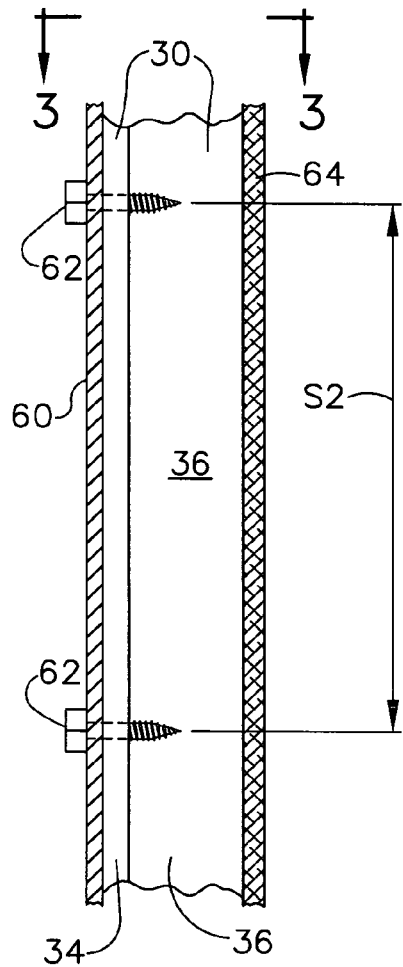
FIG. 2 is an elevational view in partial cross-section of the aluminum skin as it is mounted to a vertical rib of a conventional cargo trailer, and also the inner thin plywood layer of such a conventional cargo trailer.
Figure 3:
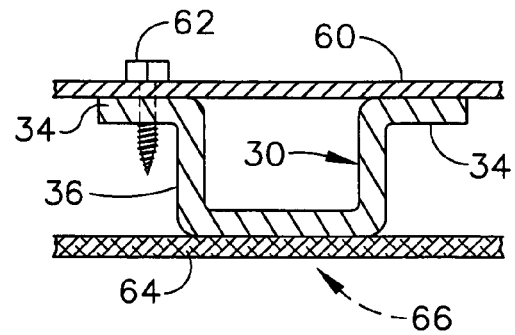
FIG. 3 is a cross-sectional view at a 90° angle from that of FIG. 2, of a conventional cargo trailer aluminum skin and vertical rib, as well as the inner plywood portion.
Figure 4:
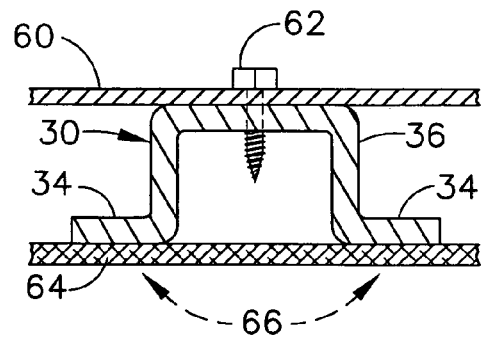
FIG. 4 is a cross-sectional view of an alternative construction of a conventional cargo trailer aluminum skin as it is attached to a hat channel rib, as it would be oriented with an inner plywood layer of a conventional cargo trailer.
Figure 5:
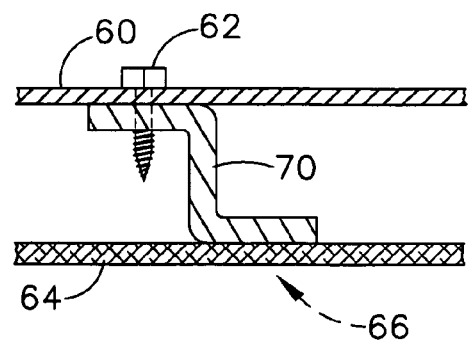
FIG. 5 shows another alternative construction of a cargo trailer aluminum skin with a vertical support rib having a Z-angle shape, along with the interior plywood layer.

On FIG. 9, the spacing between the centerlines of the screw hole apertures 174 would be the S2 spacing that was discussed above, in reference to FIG. 2. This is the desired spacing for locating mounting screws 62 through the aluminum sheet 60 and into the rib material 30. As noted above, in many conventional cargo trailers, this spacing S2 is equal to five inches, although any desired spacing could be utilized, as per the designer's choice.

It will be understood that the precise construction details discussed above could be significantly altered without departing from the principles of the present invention. For example, the two vertical support rails 162 and 164 could be effectively replaced by a single sheet of material, if desired, or a larger number of smaller support rails could be utilized, if desired. In addition, the "bridge plate" 160 that provides the proper spacing between the uppermost portion of the rib female locator 152 and the top-most target template subassembly 170 could be constructed in various alternative ways, including two or more vertical or angled support ribs or rails, all without departing from the principles of the present invention.

Figure 10:
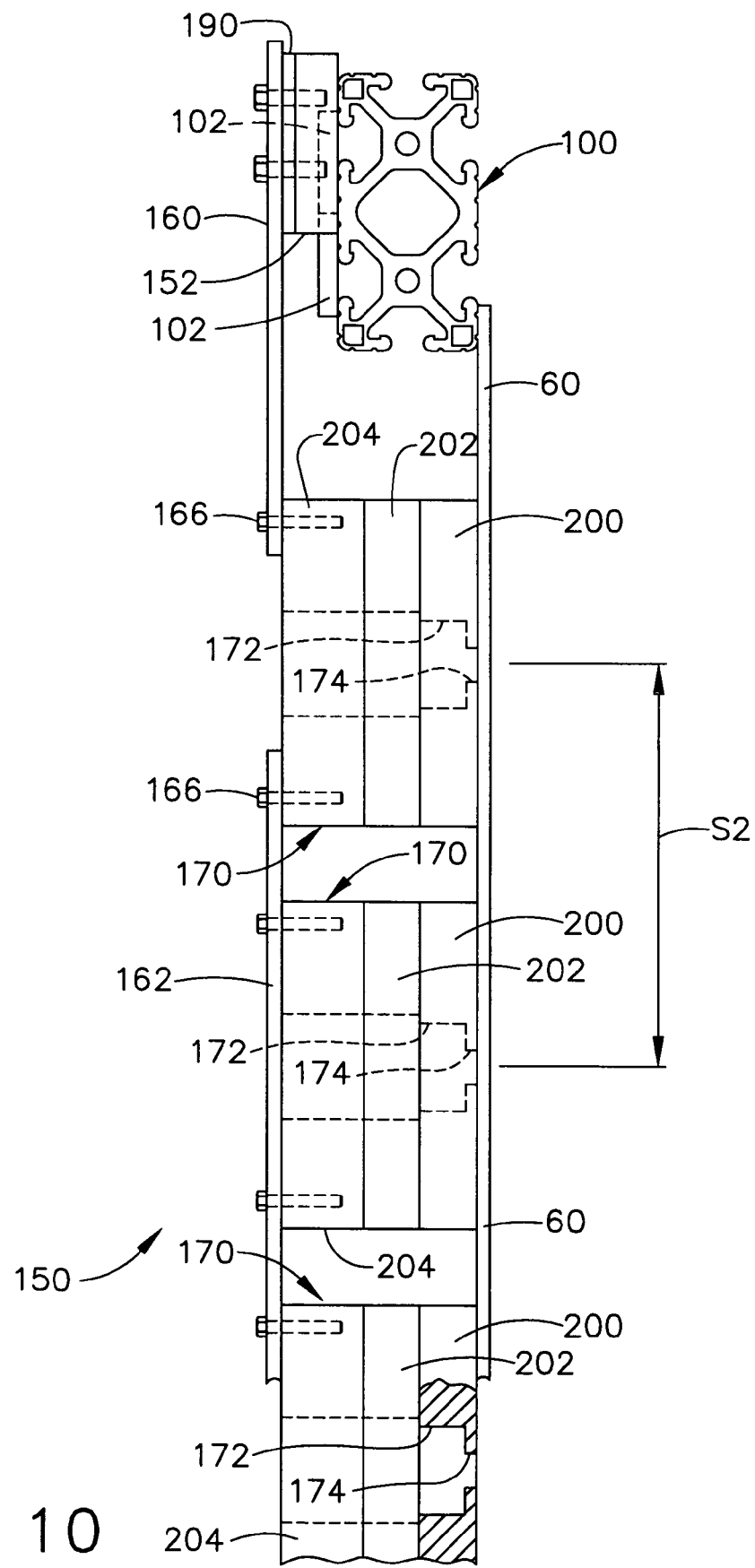
FIG. 10 is a side elevational view in partial cross-section of the rib template subassembly of FIGS. 8 and 9, as it is mounted to a beam member, and as it is oriented with an aluminum sheet material used for the side exterior body panels of a cargo trailer.

The views of FIGS. 8 and 9 were front views with respect to the rib template subassembly 150, which are also side elevational views with respect to viewing a cargo trailer under construction. Referring now to FIG. 10, a side view of the rib template subassembly 150 in partial cross-section is provided. FIG. 10 also shows the beam member 100, and its relation to the aluminum sheet material 60, as well as the positional relationships between the target template subassemblies 170 and the aluminum sheet material 60. The linear bearing 110 and adapter plate 120 are not shown on FIG. 10.

Starting at the top-most portion of the view of FIG. 10, the rib male locator 102 is in position, as it is attached to the beam member 100. The rib female locator 152 is depicted as surrounding (in essence) the rib male locator 102, since the overall rib template subassembly 150 has been "hung" onto the beam 100 by way of the rib male locator 102. A spacer 190 is attached to the rib female locator 152, and the spacer 190 in turn is attached to the bridge plate 160 by a set of screws or bolts.

Moving down to the top-most target template subassembly 170 on FIG. 10, another spacer at 204 is attached to the bridge plate 160 by use of a screw or bolt 166. Spacer 204 is in turn mated to a template support 202, which in turn is mated to a target template receptacle 200. There must be some type of opening in the spacer 204 and template support 202 so that the front portions of a screwdriver tool can be inserted through such openings, and the dashed lines on FIG. 10 indicate those openings.

There also are openings in the target template receptacle 200, namely the target for the tool nose at 172 (which is a depression, not an opening) as well as a screw aperture or opening 174, both seen in greater detail in FIG. 8. As can be seen in this side elevational view of FIG. 10, the screw aperture 174 is an opening that runs completely through the target template receptacle 200, and thus allows a screw to travel from the screwdriver tool (which would be on the left side of the rib template subassembly 150 in this view of FIG. 10) and be run into and through the aluminum sheet material 60 toward the right (in this view of FIG. 10). On the other hand, the target 172 does not create an opening completely through the target template receptacle 200, but provides a surface against which the nosepiece of the screwdriver tool can bottom out and press. As discussed above, the overall shape of the opening 172 is such that the nosepiece of the screwdriver tool is to be abutted against that surface, such that it will not substantially slip in the X or Y direction (in the plane perpendicular to the screw's travel), nor will it pivot (i.e., not twist in the worker's hand), and also it will substantially keep the screw directed "straight" into the exterior body panel at a substantially perpendicular angle to that panel. This will allow the fabricator to drive screws at the proper locations without the normal fear of slipping and ruining the outer surface of the aluminum panels 60.

FIG. 10 shows additional target template subassemblies 170, each having a spacer 204, a template support 202, and a target template receptacle 200. These are joined to one another by use of the vertical support rails 162 and 164, as also seen in FIGS. 8 and 9. The centerline of the screw apertures 174 are spaced-apart from one another by the spacing dimension S2, which corresponds to the other S2 dimensions seen in earlier figures. Again, this dimension typically is five inches, but could be adjusted to any desired dimension, as determined by the cargo trailer's designer.

Figure 11:
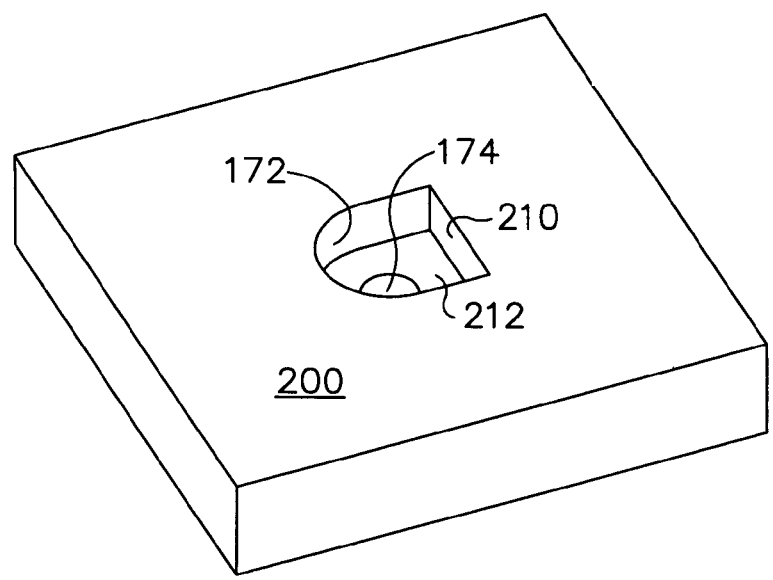
FIG. 11 is a perspective view of one of the target template receptacles used in the target template subassembly of FIG. 8.

Referring now to FIG. 11, the shape of the target 172 and the screw aperture 174 can be seen in perspective with respect to how they are formed in the target template receptacle 200. An upper portion 210 of the receptacle 200 has a D-shaped cutout that matches up to the negative image of the screwdriver tool nosepiece, and this cutout shape is designated by the reference numeral 172. The bottom portion is designated by the reference numeral 212, and forms the abutting surface against which the front portion of the screwdriver tool's nosepiece is pressed when it is time to drive a screw through the hole or cutout 174 in this bottom portion 212.

Note that this bottom portion 212 protects the outer (perhaps painted) surface of the trailer's side body panels during fabrication, since it prevents the front-most surface of the screwdriver tool's nosepiece from touching the panels' outer surface. Even a minor scratch could potentially ruin a painted body panel, and the template's receptacle 200 prevents this from occurring during this stage of fabrication.

It also should be noted that the template of the present invention, even if used without an automatic screwdriving tool, can still protect the outer surface (or finish) of the body panel. If a manual screwdriving tool is used with individual loose screws, then a pilot hole might (typically) first be drilled into the body panel before the screw is emplaced. Using conventional fabrication techniques, the drilling tool could slip, and the drill bit might scar the body panel near the hole being drilled, even before a screw is to be installed. The template of the present invention could be provided with a rather small opening (e.g., the opening 174 in template 200 of FIG. 11), and the template surface at 212 could prevent a slipped drill bit from contacting the body panel.

Figure 12:
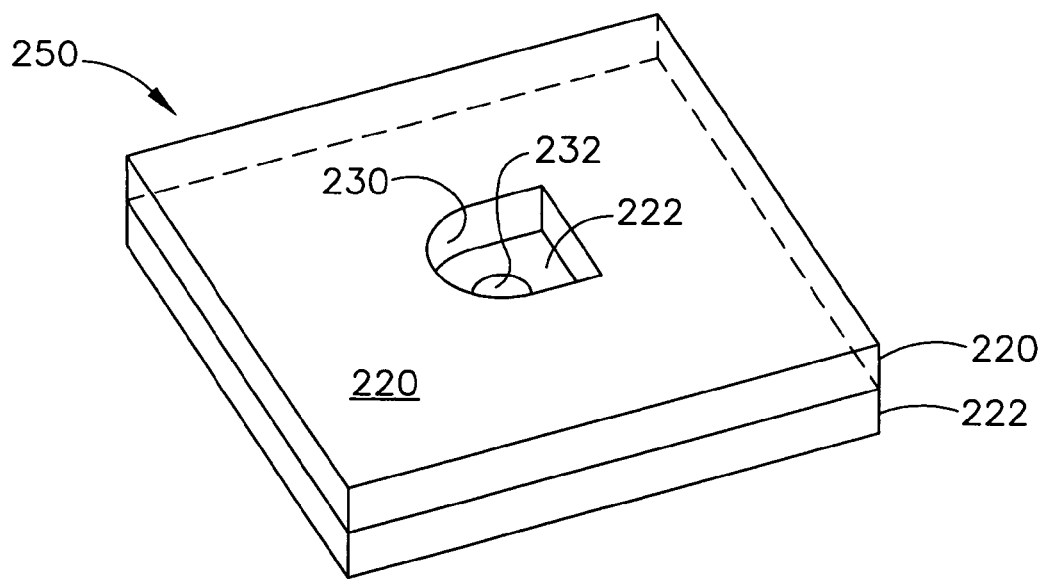
FIG. 12 is a perspective view of an alternative construction target template receptacle, made of permanent magnets.

FIG. 12 shows a similar view, except in FIG. 12 the target template receptacle is made of magnetic material. The target template receptacle of FIG. 12 is generally designated by the reference numeral 250. In this construction, the template receptacle 250 is made of layered permanent magnets, which are commonly available in the form of magnetic strips. The "top" layer 220 has the D-shaped cutout that matches up to the negative image of the screwdriver tool nosepiece, and this cutout shape is designated by the reference numeral 230. The "bottom" magnetic layer in FIG. 12 is designated by the reference numeral 222, and forms the abutting surface against which the front portion of the screwdriver tool's nosepiece is pressed when it is time to drive a screw through the hole or cutout 232 in this magnetic layer 222.

If the same screwdriver tool nosepiece is to be used for either of the embodiments in FIG. 11 or 12, then the sizes and shapes of the openings 172 and 230 would be substantially identical, as well as the size and shape of the screw aperture 174 and 232. Naturally, other shapes and sizes for other types of nosepieces could be used, without departing from the principles of the present invention. However, it is generally desirable for the shape of the cutouts 230 or 172 to closely match up to the negative image of the front portion of the screwdriver tool's nosepiece, and moreover, it is generally desirable for this shape to prevent rotation of the tool while it is being actuated, and also to substantially prevent slippage in the X- or Y-direction, again as the tool is being actuated for driving a screw into the aluminum sheet and vertical rib of the cargo trailer.

As discussed above, the target template subassembly can be made of various materials, including permanent magnets of flexible magnetic strip material. The target template itself can typically be made of a plastic material so that it can be molded, if desired. Moreover, a plastic material might be less likely to scratch or otherwise nick the nosepiece of a screwdriver tool, as opposed to a metal template. However, virtually any solid material could be used, including a metal template that includes fairly strong permanent magnets that are spaced-apart at intervals, rather than using lengthy (or otherwise large) flexible magnet strip materials.

Also as discussed above, the rib template subassembly would typically be oriented in the vertical direction, and extend from the top portion of the framework of the cargo trailer down toward the bottom portion of the same cargo trailer. In other words, the rib template subassembly would typically extend from the top horizontal corner rail of the framework to the bottom corner rail of the framework along the same side of the cargo trailer. It is not necessary for the rib template subassembly to literally extend all the way up and down along the entire side of the cargo trailer, however it must extend far enough that it provides a target template for each of the screw positions that are to be made in the aluminum sheet material. Note that it would be possible to divide the rib template subassembly into two or more separate portions, or to use a single half-portion that could be re-positioned; however, the fabricator would then have to move the rib template subassembly from a first position to a second (or even third position) while completing the fabrication steps of placing the screws through the aluminum sheet and into the vertical ribs. This could be done without departing from the principles of the present invention, but likely would be less convenient for the fabricator.

The rib template subassembly could be essentially hung from the upper portion of the cargo trailer's top elongated (mainly horizontal) rail of the framework, if desired, but something additional would have to be done to provide the proper locations in the horizontal direction for aligning the template subassembly with the actual ribs. In addition, the rib template subassembly could be positioned from the bottom portion of the factory assembly area, by having some type of wheels or skids that the rib template subassembly could be moved along, as discussed above. Another alternative is the embodiment depicted in the drawings, in which a movable horizontal beam member is used and positioned with respect to the front and rear corner posts of the framework of the cargo trailer. This elongated beam has the rib locators that will then be positioned by the fabricator at the proper horizontal locations so as to line up with the actual vertical ribs of the cargo trailer under construction.

When using the elongated beam member illustrated in FIG. 6, it will be understood that this beam member can initially be lifted to a proper location by a hoist or a crane. In this manner, the beam member can be mechanically supported by a machine, and allow its linear bearings to be moved back or forth until they line up with one of the rear corner posts or front corner posts of the cargo trailer. Once the linear bearings are properly aligned, a set of screws or bolts can be used to attach the linear bearings (through their adapter plates) to the front and rear corner posts, where they will remain until all of the screws have been driven into all of the vertical ribs of the cargo trailer, on that side of the trailer.

The cargo trailer itself must be prepared in a manner for use with the present invention. The trailer typically will require a bottom framework with four vertical corner posts attached thereto. Then the top frame members that are typically horizontal (or sloped at a non-horizontal angle) must then be added and attached to the four corner posts that typically are vertically oriented. After the bottom and top frames have been attached, the vertical ribs can then be attached between the top and bottom frame rails at their appropriate spacings. As discussed above, these vertical ribs are typically constructed of a hat channel, but of course they could be made of a different type of material having a different profile (shape), if desired.

Once the framework has been completed, a typical fabricator of cargo trailers will then "hang" the aluminum side sheets to the framework, such that they are positioned along the outer vertical ribs of the framework. This "hanging" of the aluminum side sheets can be a temporary construction stage that uses temporary fixtures, or some of the screws might be run through the aluminum side sheets into the top frame rail and/or the bottom frame rail, as desired. This is a matter for the cargo trailer manufacturer to decide. Obviously, the manufacturer will need to be careful so as to not scratch the outer surface of the aluminum side sheets at this stage of fabrication. The framework, with the aluminum side sheets that have been "hung" onto the framework, will now be moved to the side panel fabrication area on the factory floor, and the screws that hold the aluminum sheets to the vertical ribs will now be attached.

In a typical methodology for using the illustrated beam member, it is held above the cargo trailer framework by a hoist or crane, and when a new framework is ready, it will be brought to the fabrication area where the beam is waiting. Once the cargo trailer framework has been properly positioned, the hoist (or crane) will lower the beam to a correct position, and the adapter plates are then temporarily screwed or bolted to the front and rear vertical corner posts of the cargo trailer. The beam is then laterally moved until the multiple rib locators are correctly positioned above each of the support ribs that are to be screwed to an aluminum sheet. Once this has been accomplished, the beam can be locked in place by a clamp or other type of mechanical fixture, so that it will not accidentally slide or otherwise displace during the fabrication process.

Once the beam is in the correct position, the fabricator will take a rib template subassembly 150 and place it such that its rib female locator 152 is placed over one of the rib male locators 102. After that has occurred, the top portion of the rib template subassembly will be in a correct position for fabrication. If the bottom portion of the rib template subassembly is to be anchored, which typically is desirable, then the fabricator will now accomplish that action. In the illustrated embodiment, this is done by use of a pair of suction cups that will hold the bottom portion of the rib template subassembly to the aluminum sheet material that is about to be attached to the vertical ribs of the cargo trailer.

After the suction cups have been activated, the fabricator can now place screws through the openings in the target templates using an automatic screwdriver tool. After all of the screws have been driven for one of the vertical ribs, the rib template subassembly can have its suction cups released, and now be lifted from the rib locator on the beam. Thus the rib template subassembly can then be moved to one of the other rib locators along the beam, and then have its suction cups activated, now ready for inserting screws into one of the other vertical ribs of the cargo trailer.

The above procedure continues until all of the screws have been driven into each of the vertical ribs of the cargo trailer at the appropriate locations, thereby attaching all of the aluminum sheets to the trailer. Once all of the screws have been driven for an entire side of the trailer, the rib template subassembly can be removed from the beam, and the beam itself can then be moved to the opposite side of the cargo trailer for fabrication and attachment of the aluminum sheets that will make up the outer body skin for that other side of the trailer.

When the beam 100 is moved to the other side of the trailer, it can be rotated 180° along its longitudinal axis, and by doing so the rib locators 102 will now be on the correct side of the beam 100. So will the linear bearings 110 and adapter plates 120, in which the adapter plates are again screwed or bolted to the front and back corner posts of the trailer's framework on that opposite side of the cargo trailer. In the illustrated embodiment, the rib location indicators 102 are symmetrically shaped about a horizontal line, and thus they can be inverted (by rotating the beam 100) and used with the rib template subassembly 150 in that inverted position.

Once the beam linear bearings 110 have been properly attached to the rear and front posts of the opposite side of the trailer, the beam can then be laterally moved until the rib locators 102 are properly positioned above the vertical ribs 30 on that side of the trailer. The beam 100 then can be locked into position for fabrication of the aluminum skin to the vertical ribs. The above-described procedure for use of the rib template subassembly 150 will now be repeated for all of the vertical ribs. Then the beam will be released from the cargo trailer, and the trailer will have had its sidewall aluminum skin completely attached. The top surface of the cargo trailer could also be fabricated in a similar fashion, in which the rib template subassembly 150 would be used in a horizontal, rather than vertical, orientation.

As discussed above, some cargo trailers use vertical rib spacings of sixteen inches while others use vertical rib spacings of twenty-four inches. The beam 100 can be constructed so that it has one of the rib locators 102 at every spaced-apart position for both sixteen and twenty-four inches, thereby making the possible use of the beam universal for either type of cargo trailer fabrication. Of course, if a cargo trailer manufacturer wishes to use yet a different rib spacing, then the beam 100 can be accordingly constructed so that its rib locators 102 are correctly spaced for that type of trailer. The rib locators 102 also could be attached in a manner so that they may be readily detached and moved to a different lateral position along the beam, if desired. Alternatively, they can be permanently affixed to the beam 100, either by bolting or by some other more permanent method of attachment, such as welding or riveting.

Figure 13:
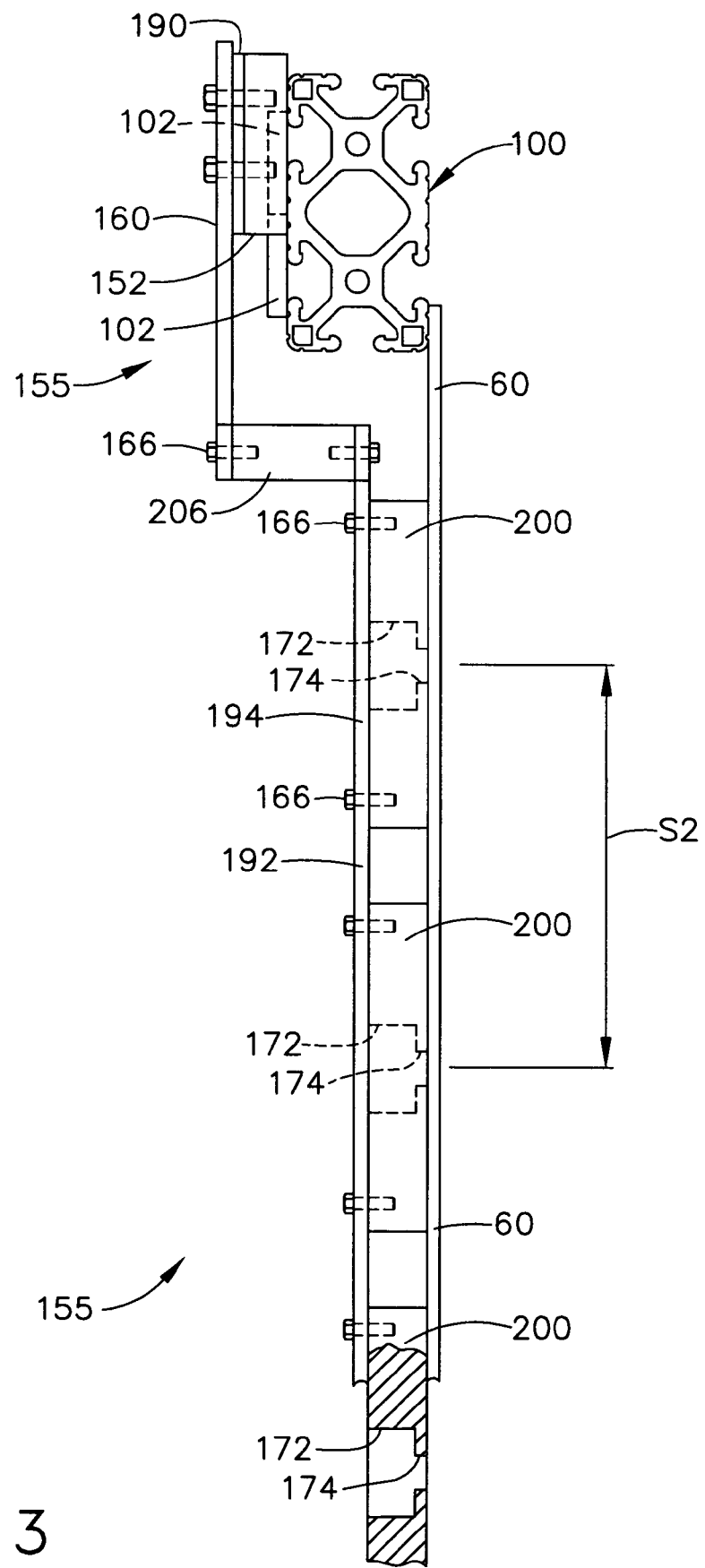
FIG. 13 is a side elevational view in partial cross-section of an alternative embodiment of a rib template subassembly, as it is mounted to a beam member, and as it is oriented with an aluminum sheet material used for the side body panels of a cargo trailer.

Referring now to FIG. 13, an alternative embodiment of a rib template subassembly is illustrated, generally designated by the reference numeral 155. In this alternative embodiment, the upper portions are approximately the same as the rib template subassembly 150 that is illustrated in FIG. 10. The elongated beam member 100 is in mechanical communication with a rib locator 102, which in turn is in mechanical communication with a rib female locator 152. A spacer 190 is also utilized, although that is not necessarily required in this embodiment. Finally, a bridge plate 160 is used, in a similar fashion to that depicted in FIG. 10.

The rib template subassembly 155 also has at least one vertical support rail 192, and a spacer 206 is used to effectively place that support rail 192 in mechanical communication with the bridge plate 160, and these parts are held together by screws or bolts 166. As can be seen when comparing the rib template subassembly 150 on FIG. 10 to the rib template subassembly 155 on FIG. 13, there are no additional spacers in the immediate vicinity of the target template receptacle 200 in the embodiment of FIG. 13, whereas in the embodiment of FIG. 10, there was a spacer 204 and a rather large template support 202.

In FIG. 13, the vertical support rail 192 can be directly in mechanical communication with each of the target template receptacles 200, by use of screws or bolts 166. The target template receptacle 200 can have an additional support, if desired, and such a support could be an optional part that is attached to the target template receptacle, in which the optional template support would be located at the reference numeral 194. This optional template support 194 could be used to provide additional mechanical strength for the target template receptacle 200. If the target template receptacle 200 was made of a strong enough material, then the optional template support 194 would not be required at all.

Each of the target template receptacles 200 exhibits a target for the nosepiece of a screwdriver tool at 172, as well as a screw aperture opening at 174, just like that depicted in FIG. 8. The fabricator can place the nosepiece of the screwdriver tool into the target 172 and quickly drill a screw through the aluminum plate 60, as described above. In addition, the centerlines of the openings 174 are spaced-apart by a predetermined distance S2 on FIG. 13, in a similar fashion to that described in FIG. 10. The target 172 again represents a depression having the shape of a negative three-dimension image of the shape of a screwdriver tool's nosepiece.

The present invention also can be used to construct flat sheets or panels that are positioned in a substantially horizontal plane, rather than in a substantially vertical plane. For example, a horizontal template fabrication fixture could be placed above (or on top of) a set of panels that are to be fabricated into a sub-floor of a vehicle such as a cargo trailer. This horizontal template fabrication fixture could be arranged much like the embodiment depicted in FIG. 9, although the guide locator and recess portions at 152 and 154 would not be needed, and the "bridge plate" adapter 160 would not be necessary. The suction cup subassembly 180 could be used if desired, or a different methodology for positioning the horizontal fixture (otherwise similar to rib template subassembly 150) could be used, such as a set of clamps. The horizontal template fabrication fixture could be larger in size if desired, and also could have multiple template targets in more than one dimension. In other words, if the rib template subassembly 150 typically exhibited targets only in a single dimension (e.g., along a vertical line), then the horizontal template fabrication fixture for use with sub-floors could have several similar targets (such as the target template subassemblies 170) in an X-Y grid pattern, along a plane.

The use of multiple target templates allows the fabricator to place the horizontal template fabrication fixture at an appropriate location over loose panels that are to be mounted to chassis members (or some type of support ribs), thereby forming a sub-floor attached to the bottom chassis of a vehicle, such as a cargo trailer. The chassis members can run in whatever pattern is desired by the trailer's designer, and can form areas where important (but "delicate") items are to be positioned beneath the sub-floor, such as water tanks, fuel tanks, electrical wiring, gas piping, water piping, etc. While these components may or may not be truly delicate, certainly it would not be good practice to drill a hole or drive a screw into one of them. The multiple target templates of the horizontal template fabrication fixture will thus be located so as to prevent such holes/screws from being placed at incorrect positions.

In addition to the added protection of assuring proper positioning of the holes/screws in the sub-floor, the target template subassemblies 170 in the horizontal template fabrication fixture will substantially prevent slipped drill bits, or slipped screws from scratching the upper surface of the sub-floor, which may be directly in view to a user after the cargo trailer is fully assembled. The target template subassemblies 170 will typically include a layer of material (e.g., the layer 212 on FIG. 11 or the layer 222 on FIG. 12) that will also prevent a screwdriving tool, or a drill from contacting the upper surface of the sub-floor. Even if the sub-floor will not be ultimately visible upon final assembly of the vehicle, the use of the horizontal template fabrication fixture will likely decrease assembly time (and with greater positioning accuracy), and will certainly prevent much of the damage that otherwise can occur during fabrication, as discussed above.

If the sub-floor will be essentially hidden from view once the fabrication has been completed, then the target template can be of a simpler form, if desired. For example, a sub-floor might be covered by finished flooring or by a rug, or the sub-floor might be painted and perhaps even be used as the visible floor that is to be walked upon. In any of these situations, less care can be exhibited during its fabrication than discussed above, in that a scratch or nick in the sub-floor's surface would not necessarily ruin the usefulness of the sub-floor while it is being built up over a framework or a chassis, for example. The target templates could thus be less complex than those illustrated at 200 on FIG. 11, for example. In this application, the layer of material at 212 will not be necessary, and the target template opening at 172 could "merge" with the screw opening 174. In other words, the size and shape of the target template opening could merely be a circular opening, like that depicted by the opening 174, and in this application, the circular opening would be the place where a round nosepiece of a screwdriver tool would be placed. Using the tool, a screw would then be run through this opening 174 and into a planar sheet, and further into a support rib or other type of support member, for example. The opening 174 would probably need to be larger, i.e., large enough for the round nosepiece of the screwdriver tool to be positioned therewithin.

When using the template structure of the present invention in this manner, the support structure could be made in a simpler manner, and could, for example, consist of a planar sheet of a single thickness with openings located at predetermined positions in that planar sheet. Since there would be no additional layer (e.g., like the layer 212) in this embodiment, the planar sheet would not need two layers, such as layers 220 and 222 depicted in FIG. 12. Instead, the planar sheet could be of a single layer, and the predetermined openings could be in a single dimension (i.e., along a single line), or the openings could be in an array format along two dimensions (i.e., along the plane of the sheet). In this embodiment, the nosepiece of the screwdriver tool could make direct contact with the sheet that is under assembly, but that would not be of concern since the sub-floor material will not be visible, once fabrication is complete. (If there is a concern about any deep scoring or scraping of the sub-floor material, then this embodiment would not be useful for that application.)

The planar sheet could be made of any suitable material, such as aluminum, plastic, or even plywood, if desired. The openings could be of any desired size and shape, such as circular, square, rectangular, or D-shaped (as in the opening 172 on FIG. 11, for example). Of course, the size and shape of the openings should match up to the negative three-dimensional size and shape of the front nosepiece of the screwdriver tool that will be used to drive the screws, during fabrication. It should be noted that this arrangement of construction could also be used for other types of structures besides sub-floors.

It will be understood that many other mechanical configurations having different construction details could be used for providing a set of target templates to drill screws into the aluminum skin panels for cargo trailers, without departing from the principles of the present invention. The two embodiments illustrated in FIGS. 10 and 13 are examples of only two such different configurations. Furthermore, the precise size and shape of the targets that are the negative image of the front nosepiece of a screwdriver tool can be much different than the shape 172 depicted in FIG. 8, and also depicted in the perspective views of FIGS. 11 and 12, again without departing from the principles of the present invention. Moreover, the horizontal template embodiments can be used for applications other than for fabricating a sub-floor of vehicles—certainly it could be used with ceilings or roofs, or other slightly sloped assembly applications. Finally, the method of support for the target template subassemblies 150 and 155 can be altered in many ways as compared to that described above, without departing from the principles of the present invention. The elongated beam member 100 that is capable of being moved in a linear fashion to line up with the support ribs of a cargo trailer is merely a single methodology for providing a mechanical support to "hang" one of the rib template subassemblies, and other types of support members could be utilized.

It also will be understood that the present invention can be used in fabricating many different types of structures, including recreational vehicles, buses, truck trailers, mobile homes, and other various types of vehicles. In addition, the present invention could be used to construct fixed objects, such as pre-fabricated buildings, sheds, or dwellings with siding, for example.

As used herein, the term "proximal" can have a meaning of closely positioning one physical object with a second physical object, such that the two objects are perhaps adjacent to one another, although it is not necessarily required that there be no third object positioned therebetween. In the present invention, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

An example of the type of automatic screwdriver tool that can be used in the present invention is described in detail in U.S. Pat. No. 5,988,026, which is assigned to Senco Products, Inc., and is incorporated herein by reference in its entirety. The front nosepiece disclosed in U.S. Pat. No. 5,988,026 does not have the exact shape of the nosepiece described for use with the present invention, however, the remainder of the screwdriver tool can be just like that described therein. Various other models of automatic screwdriver tools can also work with the present invention, including those formerly sold by Senco Products, Inc., and those now sold by DuraSpin Products, LLC, including attachments that use collated screws and which mount on the front end of powered (or manual) screwdrivers made by other manufacturers. Furthermore, as noted above, the present invention can be used with single (or loose) screws, as well as with strips of collated screws.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. An apparatus used for placing screws into a sheet of material, said apparatus comprising:
at least one elongated support member that extends between a first end and a second end;
a locating structure proximal to said first end used for positioning said at least one elongated support member at a desired predetermined location, such that said extension between said first end and said second end encompasses at least a linear distance between a first desired target location and a second desired target location; and
a plurality of target template subassemblies that are attached to said at least one elongated support member, said target template subassemblies being positioned at predetermined distances along said at least one elongated support member;
wherein,
(a) said target template subassemblies exhibit: (i) a depression that has a predetermined shape for receiving a separate screwdriver tool, and (ii) an opening that allows a separate screw to be driven therethrough;
(b) when a separate screwdriver tool is placed into said depression of one of the target template subassemblies, the size and shape of said depression substantially prevents the screwdriver tool from slipping from a proper orientation; and
(c) said positions of the target template subassemblies substantially ensure that a plurality of screws will be driven at a plurality of predetermined target locations between said first end and said second end.

2. The apparatus as recited in claim 1, wherein said proper orientation of the screwdriver tool is in a translational direction in a plane perpendicular to a desired longitudinal orientation of said screw.

3. The apparatus as recited in claim 1, wherein said opening also allows a screw to be driven into a sheet of material and into a support rib substantially at one of said predetermined target locations, such that said screw, once driven, will attach said sheet of material and said support rib together at one of the predetermined target locations.

4. The apparatus as recited in claim 3, wherein said support rib is part of a framework of a cargo trailer, and said sheet of material is an exterior body panel of said cargo trailer.

5. The apparatus as recited in claim 1, further comprising a holding apparatus, wherein: (a) said holding apparatus comprises at least one elongated permanent magnet that extends in a direction between said first and second ends of the support member; or (b) said holding apparatus comprises a plurality of permanent magnets located at multiple positions along said elongated support member; or (c) both (a) and (b).

6. The apparatus as recited in claim 1, further comprising a holding apparatus located proximal to the second end of said at least one elongated support member, said holding apparatus acting to fix the second end substantially at a predetermined position with respect to said locating structure.

7. The apparatus as recited in claim 6, wherein said holding apparatus comprises one of: (a) a suction cup; (b) a rolling bottom support member; (c) a sliding bottom support member; and (d) a permanent magnet.

8. The apparatus as recited in claim 1, wherein said predetermined shape of the depression in said target template subassemblies exhibits a negative three-dimension image of a shape of a front nosepiece of an automatic screwdriver tool.

9. The apparatus as recited in claim 8, wherein said predetermined shape of the depression in said target template subassemblies comprises: (a) a semicircular profile on a first portion of the shape and (b) a rectangular profile on a second, opposite portion of the shape.

10. The apparatus as recited in claim 1, further comprising an elongated beam member that has a plurality of spaced-apart rib location indicators, wherein said locating structure is temporarily brought into a proximal position to one of said rib location indicators which aligns a support rib with the openings of said plurality of target template subassemblies.

11. The apparatus as recited in claim 10, wherein said beam member is slidably mounted to at least one linear bearing so as to be movable to a correct horizontal position.

12. The apparatus as recited in claim 10, wherein said plurality of spaced-apart rib location indicators are symmetrically shaped so that said beam member can be rotated 180 degrees, for use with the rib location indicators then facing in the opposite direction.

13. A fabrication fixture, comprising:
(a) an elongated beam member that extends at least between a first vertical corner member of a framework and a second vertical corner member of said framework, said elongated beam member being movable in a substantially horizontal direction with respect to said framework, said beam member having a plurality of spaced-apart rib location indicators thereon between said first and second vertical corner members of said framework; and
(b) a rib template subassembly that is temporarily positioned proximal to one of said plurality of rib location indicators, said rib template subassembly comprising:
(i) at least one elongated support member that extends between a first end and a second end in a substantially perpendicular direction with respect to said beam member, said first end being proximal to said elongated beam member, said second end being distal from said elongated beam member; (ii) a locating structure located near said first end of said at least one elongated support member, said locating structure having a size and shape to abut one of said plurality of rib location indicators, and thus to correctly position said rib template subassembly with respect to said beam member;
(iii) a plurality of spaced-apart target template receptacles mounted along said at least one elongated support member, said target template receptacles having a keyed depression and a through-hole; and
(iv) a holding apparatus located between said first end and said second end of said at least one elongated support member.

14. The fabrication fixture as recited in claim 13, wherein said framework includes a plurality of spaced-apart vertical ribs, and when said beam member is positioned so that said plurality of rib location indicators are aligned with said plurality of spaced-apart vertical ribs, the through-hole in said plurality of spaced-apart target template receptacles is then aligned with one of said plurality of spaced-apart vertical ribs.

15. The fabrication fixture as recited in claim 14, wherein said framework includes a plurality of body panels positioned proximal to said plurality of spaced-apart vertical ribs, and when a screwdriver tool is positioned against said keyed depression in one of said target template receptacles, it drives a screw through said through-hole, and into one of said body panels and into one of said spaced-apart vertical ribs.

16. The fabrication fixture as recited in claim 15, wherein said keyed depression has a shape comprising a negative three-dimensional image of a nosepiece of said screwdriver tool, and substantially prevents said screwdriver tool from twisting or slipping during use while its nosepiece is abutting said keyed depression.

17. The fabrication fixture as recited in claim 13, wherein: (a) said holding apparatus comprises at least one elongated permanent magnet that extends in a direction between said first and second ends of said at least one elongated support member; or (b) said holding apparatus comprises a plurality of permanent magnets located at multiple positions along said at least one elongated support member; or (c) both (a) and (b).

18. The fabrication fixture as recited in claim 13, wherein said holding apparatus is located proximal to the second end of said at least one elongated support member, said holding apparatus acting to fix the second end substantially at a predetermined position with respect to said locating structure.

19. The fabrication fixture as recited in claim 18, wherein said holding apparatus comprises one of: (a) a suction cup; (b) a rolling bottom support member; (c) a sliding bottom support member; and (d) a permanent magnet.

20. The fabrication fixture as recited in claim 13, wherein said keyed depression in said target template receptacles exhibits a negative three-dimension image of a shape of a front nosepiece of an automatic screwdriver tool.

21. The fabrication fixture as recited in claim 20, wherein said predetermined shape of the depression in said target template subassemblies comprises: (a) a semicircular profile on a first portion of the shape and (b) a rectangular profile on a second, opposite portion of the shape.

22. The fabrication fixture as recited in claim 13, further comprising at least one linear bearing, wherein said beam member is slidably mounted to said at least one linear bearing so as to be movable to a correct horizontal position.

23. The fabrication fixture as recited in claim 22, wherein said plurality of spaced-apart rib location indicators are symmetrically shaped so that said beam member can be rotated 180 degrees, for use with the rib location indicators then facing in the opposite direction.

24. An apparatus used to assist in fabricating a sheet of material to a hidden body, said apparatus comprising:
at least one support member that extends substantially in a plane;
a plurality of target template subassemblies that are attached to said at least one support member, said target template subassemblies being positioned at predetermined locations along said at least one support member;
wherein,
(a) said target template subassemblies exhibit: (i) a substantially planar area of material having a predetermined thickness; (ii) a depression in said substantially planar area of material, said depression having a predetermined shape for receiving a separate tool, (iii) said depression not extending completely through said substantially planar area of material, and thereby forming a wall having a shape that is substantially the same as said predetermined shape, and (iv) an opening in said wall that extends therethrough;
(b) when a separate tool is placed into said depression of one of the target template subassemblies, the size and shape of said depression substantially prevents the tool from slipping from a proper orientation; and
(c) said positions of the target template subassemblies substantially ensure that said separate tool will be used only at a plurality of predetermined target locations along said at least one support member.

25. The apparatus as recited in claim 24, wherein said separate tool comprises a screwdriver, and said positions of the target template subassemblies substantially ensure that a plurality of screws will be driven at said plurality of predetermined target locations along said at least one support member.

26. The apparatus as recited in claim 25, wherein said proper orientation of the screwdriver tool is in a translational direction in a plane perpendicular to a desired longitudinal orientation of a screw.

27. The apparatus as recited in claim 25, wherein said opening also allows a screw to be driven into a sheet of material and into a support member substantially at one of said predetermined target locations, such that said screw, once driven, will attach said sheet of material and said support member together at one of the predetermined target locations.

28. The apparatus as recited in claim 25, wherein said predetermined shape of the depression in said target template subassemblies exhibits a negative three-dimension image of a shape of a front nosepiece of an automatic screwdriver tool.

29. The apparatus as recited in claim 28, wherein said predetermined shape of the depression in said target template subassemblies comprises: (a) a semicircular profile on a first portion of the shape and (b) a rectangular profile on a second, opposite portion of the shape.

30. The apparatus as recited in claim 24, wherein said separate tool comprises a drill, and said positions of the target template subassemblies substantially ensure that a plurality of holes will be made at said plurality of predetermined target locations along said at least one support member.

31. An apparatus used to assist in fabricating a sheet of material to a hidden body, said apparatus comprising:
   a support member that extends substantially in a plane;
   a plurality of target templates that are positioned at predetermined locations along said at least one support member;
   wherein,
   (a) said target templates exhibit: (i) a depression in said substantially planar support member, said depression having a predetermined shape for receiving a separate tool, and (ii) an opening that extends completely through said substantially planar support member;
   (b) when a separate tool is placed into said depression of one of the target templates, the size and shape of said depression substantially prevents the tool from slipping from a proper orientation; and
   (c) said positions of the target templates substantially ensure that said separate tool will be used only at a plurality of predetermined target locations along said at least one support member; and
   (d) said predetermined shape of the depression in said target templates exhibits a negative three-dimension image of a shape of a front nosepiece of an automatic screwdriver tool.

32. The apparatus as recited in claim 31, wherein said opening allows a fastener to be moved therethrough by said automatic screwdriver tool.

* * * * *